(12) United States Patent
Banda et al.

(10) Patent No.: US 8,924,382 B2
(45) Date of Patent: Dec. 30, 2014

(54) TECHNIQUES FOR DISTRIBUTING INFORMATION OVER A NETWORK

(75) Inventors: Ravi Banda, Fremont, CA (US); Vinay Vegunta, Dublin, CA (US); Gopi Jaggavarapu, Fremont, CA (US); Kathi Lynn Chenoweth, Schererville, IN (US); Vivian W. Wong, Danville, CA (US)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 13/474,586

(22) Filed: May 17, 2012

(65) Prior Publication Data

US 2013/0086089 A1 Apr. 4, 2013

Related U.S. Application Data

(60) Provisional application No. 61/542,676, filed on Oct. 3, 2011.

(51) Int. Cl.
*G06F 17/30* (2006.01)
(52) U.S. Cl.
CPC .... *G06F 17/30867* (2013.01); *G06F 17/30029* (2013.01)
USPC .......................................................... 707/732
(58) Field of Classification Search
CPC .................... G06F 17/30554; G06F 17/30029; G06F 17/30867
USPC ......................................... 707/732–734, 754
See application file for complete search history.

(56) References Cited

U.S. PATENT DOCUMENTS

| | | | |
|---|---|---|---|
| 7,739,139 B2 | 6/2010 | Robertson et al. | |
| 2009/0144808 A1* | 6/2009 | Dhananjaya | 726/4 |
| 2009/0265319 A1* | 10/2009 | Lehrman et al. | 707/3 |
| 2010/0125611 A1* | 5/2010 | Boutboul et al. | 707/794 |
| 2010/0312650 A1* | 12/2010 | Pinckney et al. | 705/14.66 |

OTHER PUBLICATIONS

Oracle Fusion Applications—"Oracle Fusion Talent Management Overview"; Apr. 2011; 9 pages.

* cited by examiner

*Primary Examiner* — Thu-Nguyet Le
(74) *Attorney, Agent, or Firm* — Trellis IP Law Group, PC (57) ABSTRACT

Techniques for distributing information over a network having a database in data communication with said network include a method that records in the database a plurality of computer readable profiles. Each computer readable profile corresponds to one of multiple users of the network. One of the computer readable files includes a query term that is associated with it. Generated on a common user interface are both perceivable stimuli in response to activity on said network of users corresponding to subgroup of the plurality of computer readable profiles, and information corresponding to computer readable profiles of the subgroup. The corresponding users of the subgroup possess knowledge related to the query term. A region of the user interface in which the perceivable stimuli is present defines an activity stream region. A region of the user interface in which said information is present defines a connections region of the user interface.

16 Claims, 8 Drawing Sheets

TECHNIQUES FOR DISTRIBUTING INFORMATION OVER A NETWORK

CROSS REFERENCES TO RELATED APPLICATIONS

This application claims priority from U.S. Provisional Patent Application Ser. No. 61/542,676, entitled COLLABORATIVE LEARNING, filed on Oct. 3, 2011, which is hereby incorporated by reference as if set forth in full in this application for all purposes.

BACKGROUND

Some of the daunting tasks in an organization are identification of experts for collaboration, sharing of knowledge with peers and colleagues, and ensuring the acquired knowledge is shared uniformly so it may be re-used over and over again. A common problem individuals in an organization have is finding enough ongoing or up-to-date learning to help them be effective in their jobs. The nature of work is that it is changing sufficiently fast enough that a corporate university or set of class offerings by an organization approach may not be able to provide sufficient up-to-date content to meet the needs of the organization and/or the individual.

As a result, individuals may resort to the traditional method of finding critical content and experts by simply asking people they know or using corporate knowledge systems and forums. Such approaches may be ineffective because there is no way to ensure the appropriate expert is found as one is limited to who they directly ask. These approaches may also be a waste or inefficient use of resources because a search for experts must be repeatedly performed by each individual seeking an expert. The problem exists both for the experts and the people looking for them because the ability for an individual to share widely their expertise in a way that can be consumed effectively by others does not exist with current approaches.

E-mail, phone or face-to-face communication do not provide a central place to review or store information. Rather, information is scattered in different places and at times may not be accessible by the appropriate people. Accordingly, it is desirable to provide an efficient and effective way to communicate expert information.

SUMMARY

Techniques for distributing information over a network having a database in data communication with the network include a method that records in the database a plurality of computer readable profiles. Each computer readable profile corresponds to one of multiple users of the network. One of the computer readable files includes a query term that is associated with it. Generated on a common user interface are both perceivable stimuli in response to activity on the network of users corresponding to subgroup of the plurality of computer readable profiles, and information corresponding to computer readable profiles of the subgroup. The corresponding users of the subgroup possess knowledge related to the query term. A region of the user interface in which the perceivable stimuli is present defines an activity stream region. A region of the user interface in which the information is present defines a connections region of the user interface. The query term is usually a term descriptive and/or indicative of a subject for which the user corresponding to the one of the plurality of computer readable profiles desires additional information. For example, the query term may relate to a goal and/or a topic related to a task for which the user is responsible to complete. To acquire additional information the user posts the query term on the network with the expectation that a response from another user with information concerning the query term will be received. Also disclosed are a system and a computer readable medium to facilitate carrying-out the method. These and other embodiments are described more fully below.

DETAILED DESCRIPTION OF EMBODIMENTS

Figure 1:
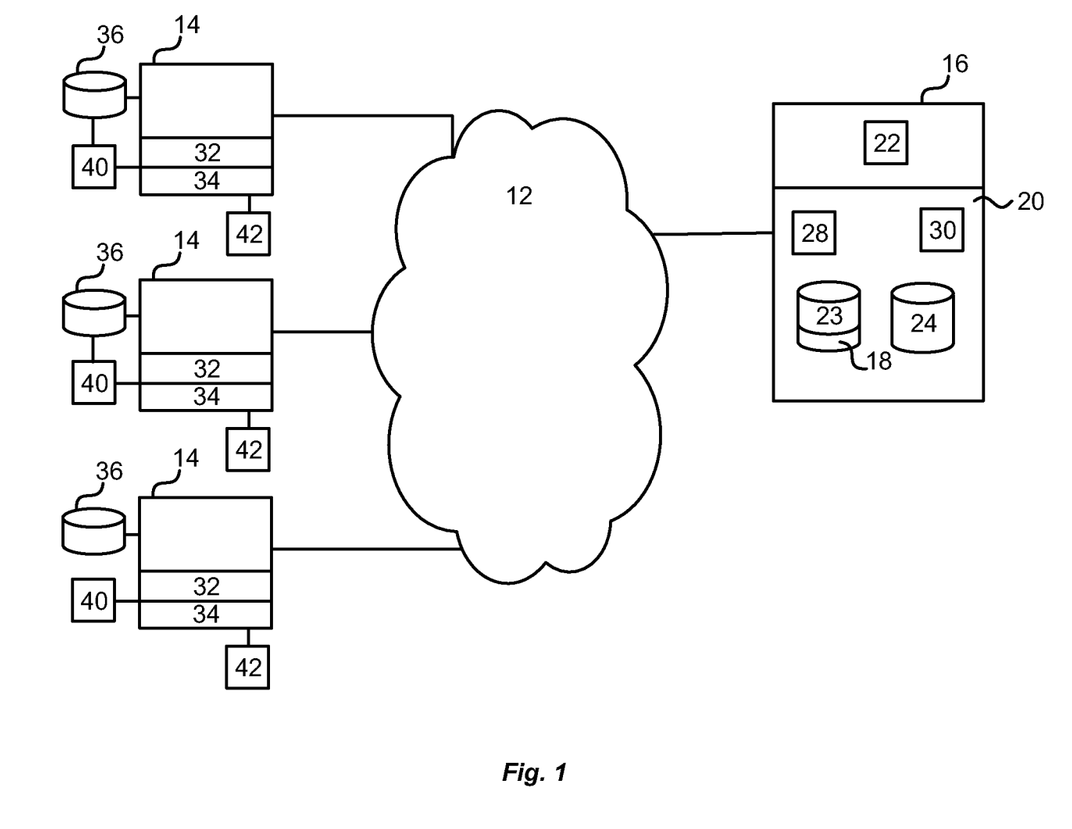
FIG. 1 is a plan view of a network in accordance with the present invention.

FIG. 1 illustrates computer network 10 for distributing information product incentives over a data communication network 12 that includes one or more client terminals 14 in data communication over data communication network 12. Also in data communication with client terminals 14 is a server 16 including a database 18 stored in a memory space 20. Server includes a processor 22 that is in data communication with memory space 20. Processor 22 may be any known processor sub-system in the art, e.g., the CORE DUO® or the CORE 2 DUO® from Intel Corporation of Santa Clara, Calif. Memory space 20 includes drive storage, shown as one or more hard drives 23 and 24, as well as data and instruction registers, shown as 28, and volatile and non-volatile memory shown as 30. Similarly each client terminal 14 includes a processor 32 in data communication with memory space 34. Processor 32 may be same as processor 22, but need not be. Memory space 34 includes drive storage, shown as hard drive 38 and includes one or more input/output devices, such as mouse, keyboard and the like, shown as 40, as well as a display 42 in data communication with processor 32. Data communication network 12 may be any network or combination of networks of devices that communicate with one another. Network 12 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, referred to as the Internet. However, it should be understood that the networks that the present invention might use are not so limited, although TCP/IP is a frequently implemented protocol.

Figure 2:
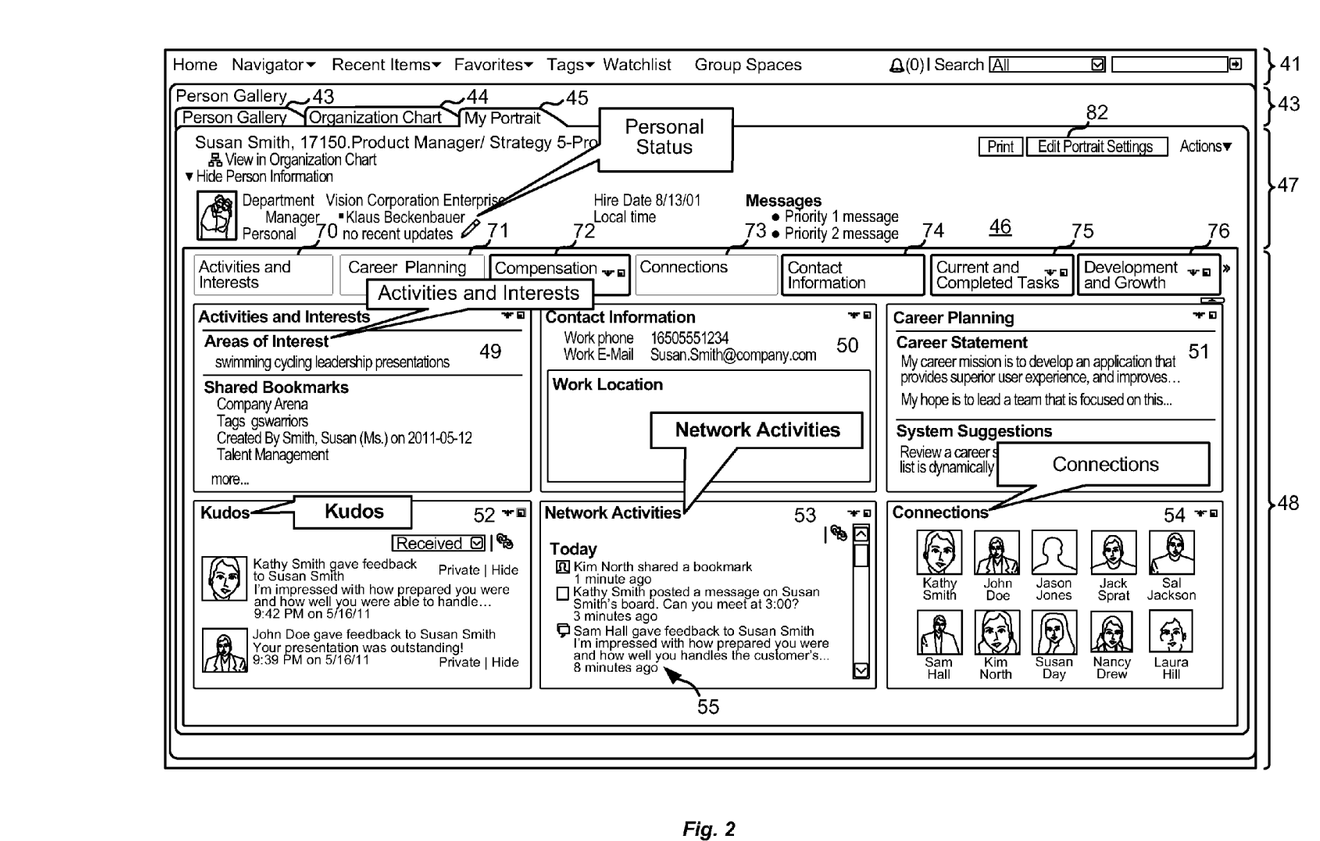
FIG. 2 is a plan view of a first page of a user interface in accordance with the present invention.

Referring to both FIGS. 1 and 2, rendered one or more displays is a user interface 40, which is divided into multiple regions, shown generally as that includes Included in each client terminal 14 is a display upon which a user interface 40 may be rendered. User interface 40 includes a global navigation region 41 and a local navigation section 42. Local navigation region 42 includes a plurality of tabs 43, 44 and 45, each of which corresponds to a different page of content. Global navigation region 41 allows access to different group of tabs. The current group of tabs is referred as the home group and includes tab 43, 44 and 45. Tab 45, entitled My Portrait tab, renders a page 46 that includes a personal profile region (PPR) 47 and a social networking region (SNR) 48. PPR 47 includes information corresponding to the home user, i.e., the user to which page 46 applies. Although virtually any content may be rendered in SNR 48 the present example includes six separate regions, 49, 50, 51, 52, 53 and 54, however more may be present, discussed more fully below. Regions 49, 50 and 51 augments information present in PPR 47. In the present example region 49 includes information corresponding to the activities and interests of the user identified in PPR 47, and region 50 includes contact information for the same. Region 51 includes information concerning the career goals. Region 52 includes information from users of network 10 that have experience interacting with the user corresponding to PPR 47. As shown, an image of the user may be shown next to a comment that the user contributed to the user corresponding to PPR 47. Region 52 is referred to as the Kudos region, for that reason.

Figure 3:
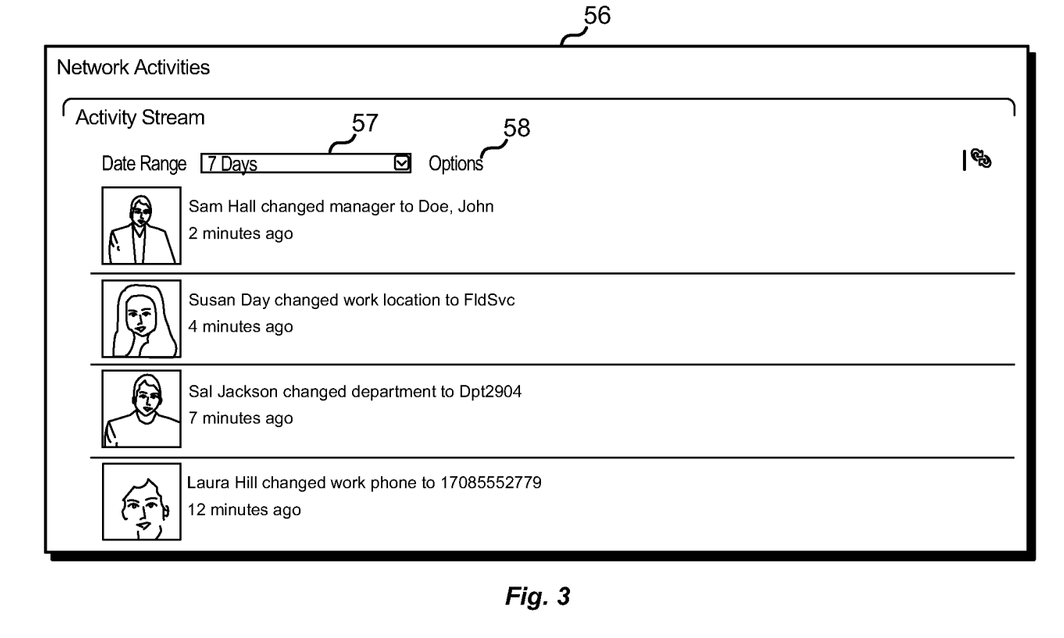
FIG. 3 is a plan view of a second page of a user interface in which filtering rules are established for the Activity Stream shown in FIG. 1, in accordance with the present invention.

Region 53, referred to as the Network Activity region 53 includes an Activity Stream 55. Activity Stream 55 includes information related to activity on network 10 of users having connections with the home user. An example of users may be those included in Connections Region 54. An example of activity that may be reflected in the information of Activity Stream 55 is the communication between two users of network, shown by entry 56 in which a message is indicated as having been sent. It should be understood that the communication need not include the home user. Rather it may relate to multiple users having connections with the home user. Additionally, Activity Stream 55 may include information related to accolades for the home user that are present in Kudos Region 52. While this information is redundant on the home user's page 46, it should be borne in mind that Activity Stream 55 is present on each client terminal 14 so that other user of the network 10 may concurrently have rendered on the display corresponding thereto common information. In this manner, Activity Stream 55 functions as a news feed for network, such as the type commonly associated with a "feed reader" or "aggregator". It is possible that Activity Stream 55 on each of client terminals 14 render information corresponding to each and every activity undertaken by all users on network 10. However, such an onslaught on information might prove counter-productive to each user. To that end, a filtering process may be employed to prevent all but desired content from being rendered in Activity Stream 55 relate to activity of users on network 10. For example it may be that only user with connections to the home user will have content rendered in the home user's Activity Stream 55. In this fashion, it is possible that Activity Stream 55 on different client terminals 14 have different content rendered therein. As shown in FIG. 3, an example of a filter screen 56 is shown as including a pull down box 57 that provides several options of filtering. In the present example filtering is undertaken based upon the age of the activity, e.g., activity greater than seven day old is omitted from Activity Stream 55, shown in FIG. 2. Other filtering operations may be implemented by activation of the Option virtual button 58, which renders an Activity Stream Options Interface (SOI) 60 shown in FIG. 4. In another, implementation it may be that information rendered in Activity Stream 55, shown in FIG. 2, being related to a common interest, topic or the like, referred to as a query term, discussed more fully below.

Figure 4:
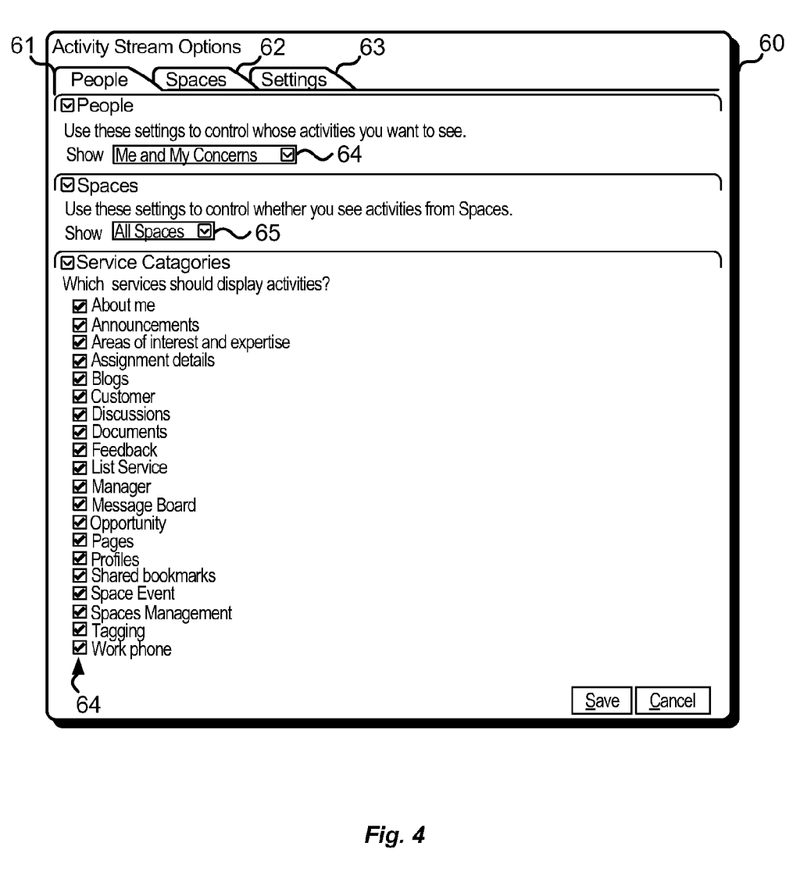
FIG. 4 is a plan view of a third page of a user interface in which distribution options are established for the Activity Stream shown in FIG. 1, in accordance with the present invention.

Referring to both FIGS. 2 and 4, SOI 60 includes a plurality of tabs People Tab 61, Spaces Tab 62 and Settings Tab 63. People Tab 61 allows the home user designate users of network that will receive information concerning the home user's activity on network 10 using pull-down menu 64. Spaces Tab 62 allows the home user to designate users of network that are members of collaborative spaces to view the home user's activities using pull down menu 65, discussed more fully below. Settings tabs enables the home user to determine which activities the home user performs on network 10 will be reflected in Activity Stream 55. This is achieved by use of check boxes 64.

Figure 5:
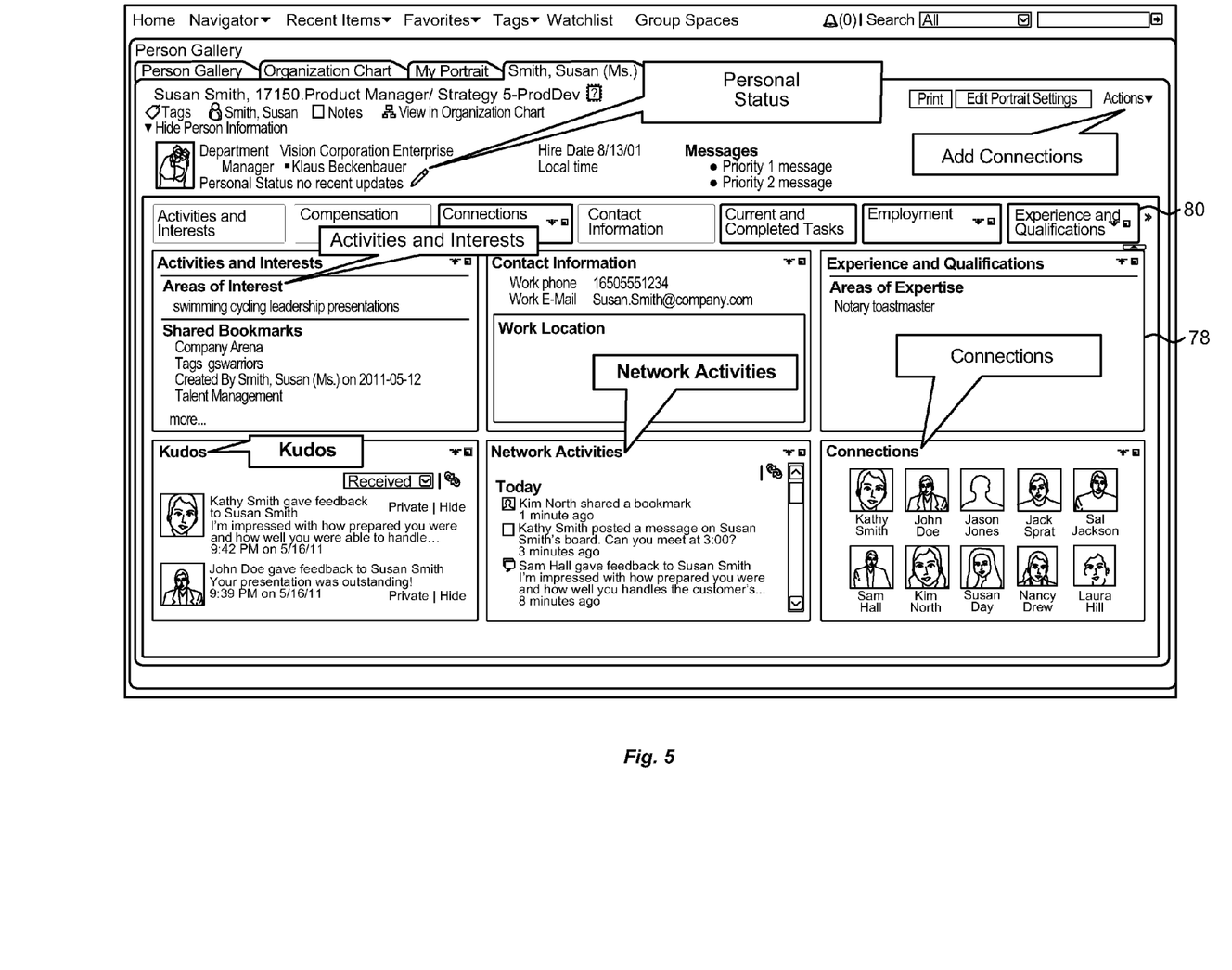
FIG. 5 is a plan view of the first page of user interface, shown in FIG. 1, demonstrating additional content regions that may be rendered thereon in accordance with the present invention.

Referring to both FIGS. 2 and 5, as discussed above more than six regions of content may be viewed on page 46. This is achieved by activating one of a plurality of floating virtual buttons (FVB) buttons, seven of which are shown as 70-76. In FIG. 2 FVBs 70, 71, 74 are activated resulting in Regions 49, 50 and 51 being rendered on page 46. More FVBs may be shown by activation of scroll arrow 77. In this manner, the home user may render additional regions on page 46 in lieu of one of regions 49, 50 and 51: Experience and Qualification Region (EQR) 78, for example by activating FVB 80. FVB 80 was exposed by activation scroll arrow 77. Regions, 52 and 53 are always rendered on page 46 in each client terminal 14.

Figure 6:
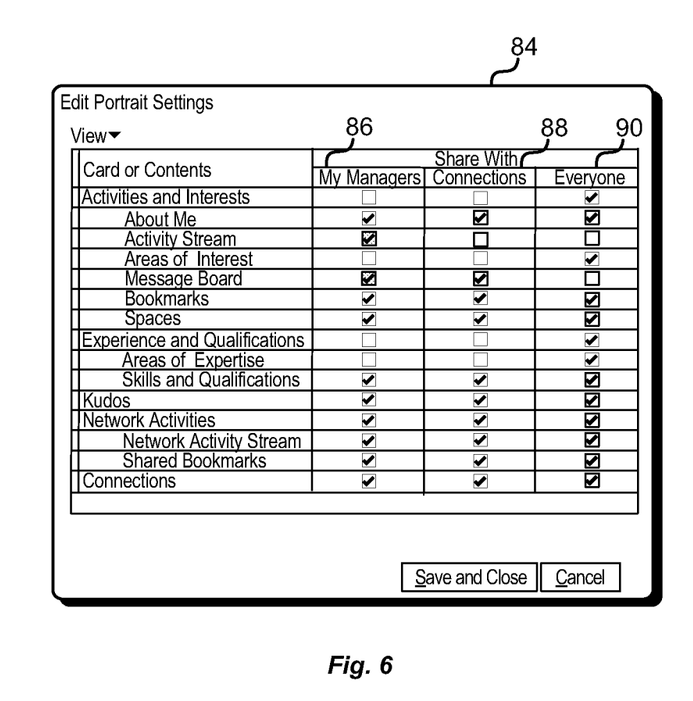
FIG. 6 is a plan view of a fourth page of a user interface in which distribution options are established for content regions of the social network region of the first page of the user interface shown in FIG. 1, in accordance with the present invention.

Referring to both FIGS. 2 and 6 control over the sharing of content in each of regions rendered in SNR 48 may be managed by activation of virtual button 82. In response to activation of virtual button 82 a matrix 84 of check boxes rendered superimposed upon page 46. Although three categories of groups with whom content may be shared is shown, any number may be provided, dependent upon the application. Three categories are shown, My Manager 86, Connections 88 and Everyone 90. Everyone 76 refers to all users of network 10. Connection 74 refers to users with whom the home user has connected, in a manner analogous to friending a user in a common social network application, discussed more fully below. My Manager 72 refers users of network 10 having supervisory control over the home user, e.g., such as an employer-employee relationship of supervisor-employee relationship and the like.

Figure 7:
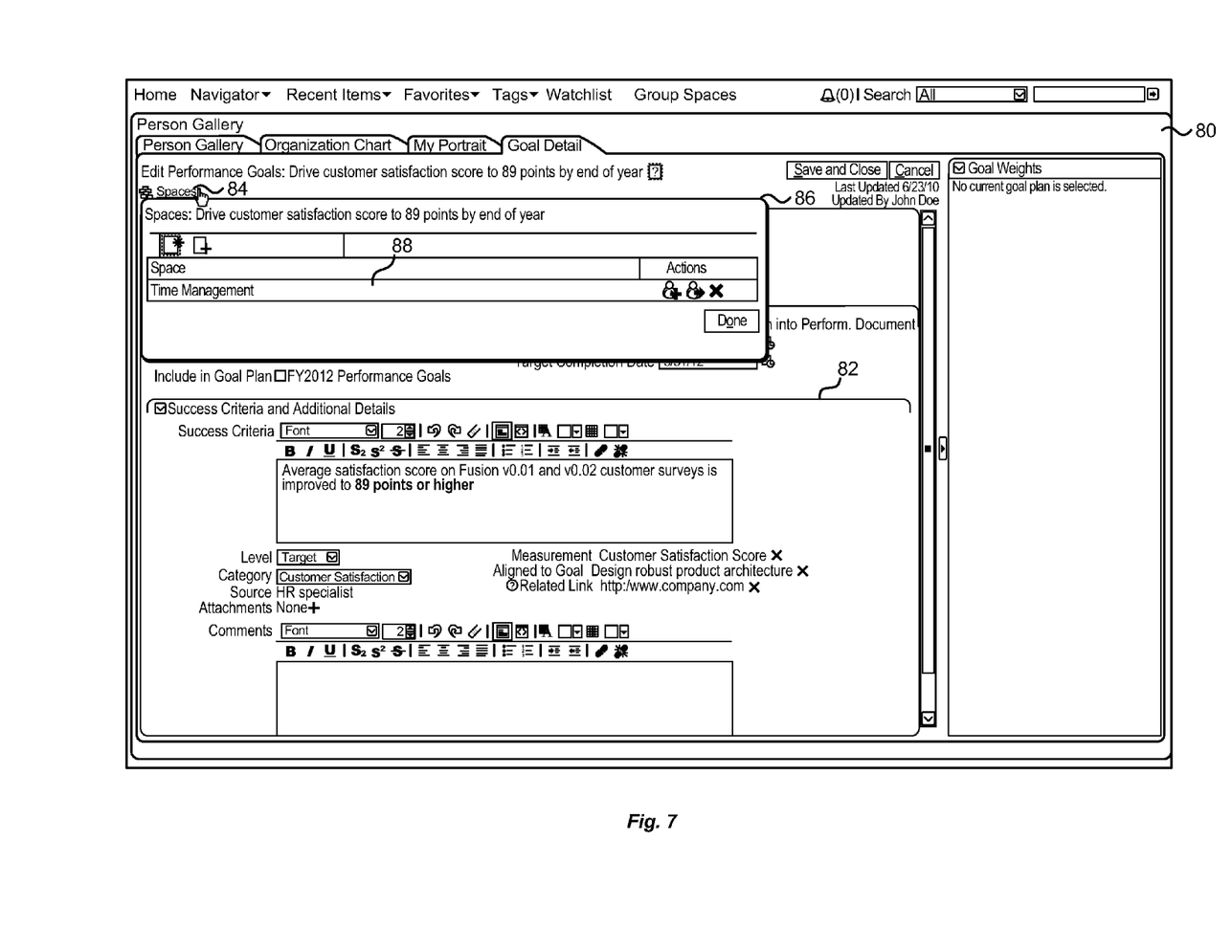
FIG. 7 is a plan view of a fifth page of a user interface in which goal information may be defined for a user.

Referring to both FIGS. 5 and 7 one advantage of the present embodiments is the ease with which collaboration may be achieved. As mentioned above, included in SNR 48 is content concerning Experience and Qualifications 78. The ability to search network 10 for specific qualifications, e.g., expertise, in desired areas of interest is a powerful feature. For example, the home user may desire to establish a goal, such as a career goal on Goal Integration Page (GIP) 80. GIP 80 is accessed through the Development and Growth Region (DGR) (not shown) that is access through FVB 76, shown in FIG. 2. Specifically a list of goals (not shown) is present in DGR (not shown), each of which links to a page associated therewith, one of which is shown as GIP 80. In this manner, the home user may enter information related to the goal. For example, in the Additional Detail Region (ADR) 82 of page 80 the home user may include information related to the details of the goal. In this case, Effective Time Management is the stated goal. Also included on GIP 80 is a Spaces Virtual Button (SVB) 84. Activating SVB 84 causes a Space Associate Menu (SAM) 86 to be rendered in which the stated goal may be associated. Specifically SAM 86 allows the home users to associate the stated goal with an existing Space on network 10 that includes content related to the goal. Alternatively, SAM 86 enables the home user to generate a new spaced directed to the goal.

A space is merely a functional feature of network 10 that allows collaborative communication between users of network 10 to discuss a topic. It is the intention that off-topic communications would not be present in a given space. In the present example, the space generated by SAM 86 is entitled Time Management, as indicated in dialog entry box 88 of SAM 86. Upon generating a space, which in this example relates to time management, a collection of data related to the topic is generated on database 18, referred to as Time Management Space (TMS) data 90. TMS data 90 is made available to all users of network 10, as are all spaces created thereon. In this manner, network 10 provides multiple public forums through which users of network 10 may communicate. Ideally, each space is topic independent of the remaining spaces on network 10 so as to minimize, if not prevent, redundancy of topics. This facilitates centralizing information for each topic of interest, on the network 10, in one area. In this manner, space utilization of network 10 hardware is maximized and collaboration is facilitated.

Figure 8:
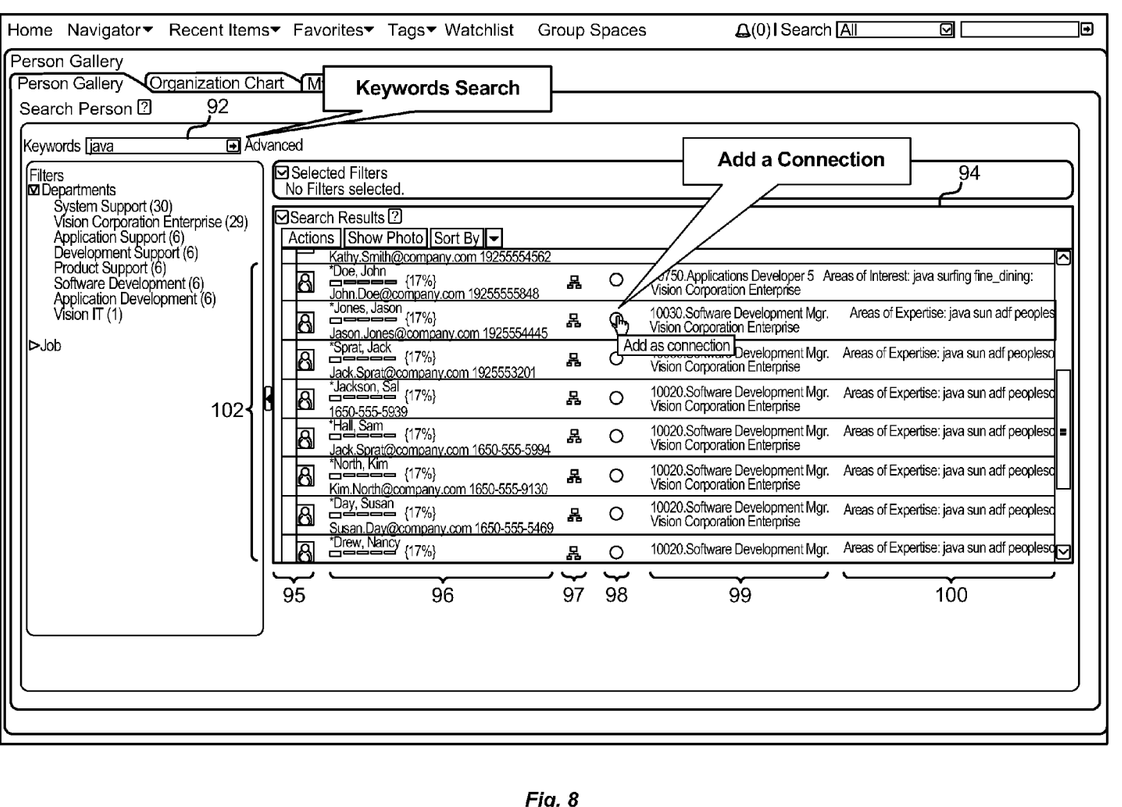
FIG. 8 is a plan view of a sixth page of a user interface by which searches of the database is undertaken in accordance with the present invention.

Referring to both FIGS. 2 and 8, as might be expected countless numbers of topics may be present on database 18. To facilitate identifying an appropriate topic a Personal Gallery Page (PGP) 90 may be employed to search for topics of interest, as well as users of networks having knowledge related to a topic of interest. As shown therein a data entry box 92 into which search terms may be entered. A Search Results Region 94 is also included in GPP90 in which results of the search of the term entered into data entry box 92 are recited. In the example shown, the term search is "Java". The results shown in SRR 94 are arranged in a matrix as a plurality of columns 95-100 and multiple rows 102. Column 95 is an action column that allows a person having supervisory responsibilities over home user to indicate Human Resource Actions undertaken with respect to the home user. Column 96 includes information, such as name, e-mail and the like of users that satisfy the query term. For example, the users of network 10 may be identified as having experience with the topic that is the subject of the search terms, e.g., expertise. This is shown in column 100. Column 99 identifies the users' position and location within the network, e.g., company. Column 98 is a link that enables the home user to establish a connection with the user that is identified in SRR 94. Column 97 shows a user's position amongst other users in an organization chart. In one example, the term entered into data entry box 92 may be a goal of the home user. In this manner, the goal established in ADR 82, shown in FIG. 7, functions as a search term.

The search term functionality of the goal may be employed to seeking additional information from network 10 related to achieving the goal. The configuration of network 10 facilitates this, in part, by the inclusion of information in the SNR 48 related to the user's experiences and expertise as shown in EQR 58 of FIG. 5. The content contained therein that matches the search query, in this case, the home user's goal, is use to identify users of network 10 with knowledge related to the topic that is searched, in the case the goal. As the search query is run database is searched for information associated with users' experience and expertise that matches the search query. Information corresponding to these users is rendered in SRR 94. Moreover, the links in column 98 facilitates quickly creating a connection with the desired users, i.e., users having knowledge related to the search query. Upon activating links in column 98 associated with the desires users of network 10, the personal profiles thereof are included in Connections Region 54, shown in FIG. 5. Thereafter, in accordance with the setting established, activities of these users on network 10 may concurrently be rendered in Activity Stream 55 concurrently with the activities taking place. By monitoring Activity Stream 55 the home user is afforded an opportunity to be notified in real time of communications that ostensibly related to the search query, i.e., goal. In this manner, rapid distribution of information tailored to a desired topic may be distributed and observed efficiently throughout network 10.

It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Oracle Corporation. Therefore, the scope of the appended claims should be accorded the broadest interpretation so as to encompass all such modifications and similar arrangements.

We claim:

1. A method, performed by one or more processors, for distributing information over a network having a database in data communication with said network, with the database storing a plurality of computer readable user profiles and collaborative workspaces, said method comprising:

creating in said database, in response to input signals from an input device specifying a first topic related to a goal, a first collaborative space in the network dedicated to the first topic to facilitate centralizing communications related to the first topic in one area of the network and where off-topic communications are not present in the first collaborative space;

associating, in response to input signals from an input device, an existing second collaborative space with the goal, with the existing second collaborative space dedicated to a second topic related to the goal and where off-topic communications are not present in the existing second collaborative space;

searching said first collaborative space and said existing second collaborative space, in response to input signal from an input device, for a query term related to the goal;

generating search result information, in response to said query term, retrieved from said database for display in a search result user interface including multiple rows, with each row including personal information relating to experience and expertise of a user on the network, an icon showing a position of the user in an organization and a control for selecting the user as a contact;

collecting, in response to input signals from an input device, network activity of users other than a designated user of the network based on filtering criteria, with the filtering criteria including one or more of selecting a group of users having a selected position in the organization, selecting a collaborative space and selecting users that are contacts; and generating, in response to input from a user input device, profile information relating to selected contacts of a designated user.

2. The method of claim 1 further comprising:

associating said query term with a collaborative space in said network.

3. The method of claim 1 further comprising:
defining a connection group; and
displaying only activity of users of said network in said connection group.

4. The method as recited in claim 1 wherein said network activity is selected from a set of network activities including posting of a query term, communication between two users of said network, and posting of a uniform resource locator (url) with a corresponding descriptive title indicating the information that may be present at the url.

5. The method as recited in claim 1 further comprising:
rendering said search result information, network activity and profile information in separate regions of a computer display having a plurality of regions.

6. A computer system comprising:
a processor; and
a memory space having a database stored therein, with the database in communication with a network and storing a plurality of computer readable user profiles, and with the memory having and one or more stored sequences of instructions which, when executed by the processor, cause the processor to carry out the steps of:
creating in said database, in response to input signals from an input device specifying a first topic related to a goal, a first collaborative space in the network dedicated to the first topic to facilitate centralizing communications related to the first topic in one area of the network and where off-topic communications are not present in the first collaborative space;
associating, in response to input signals from an input device, an existing second collaborative space with the goal, with the existing second collaborative space dedicated to a second topic related to the goal and where off-topic communications are not present in the existing second collaborative space;
searching said first collaborative space and said existing second collaborative space, in response to input signal from an input device, for a query term related to the goal;
generating search result information, in response to said query term, retrieved from said database for display in a search result user interface including multiple rows, with each row including personal information relating to experience and expertise of a user on the network, an icon showing a position of the user in an organization and a control for selecting the user as a contact;
collecting, in response to input signals from an input device, network activity of users other than a designated user of the network based on filtering criteria, with the filtering criteria including one or more of selecting a group of users having a selected position in the organization, selecting a collaborative space and selecting users that are contacts; and
generating, in response to input from a user input device, profile information relating to selected contacts of a designated user.

7. The system as recited in claim 6 wherein said sequences of instructions further includes computer-executable code when executed by the processor cause the processor to carry out a step of associating said query term with a collaborative space in said network.

8. The system as recited in claim 6 wherein said sequences of instructions further includes computer-executable code when executed by the processer to cause the processor to carry out the step of displaying said activity concurrently with the corresponding members of said subgroup performing said activity.

9. The system as recited in claim 6 wherein said sequences of instructions further includes computer-executable code when executed by the processor to cause the processor to carry out the step of rendering a representation of activity concurrently with the corresponding users of said subgroup performing said activity, defining an activity stream region of said user interface, with said subgroup including computer readable profiles and blocking information related to activity of a subset of said subgroup from being rendered in said user interface in accordance with a filtering criteria.

10. The system as recited in claim 6 wherein said sequences of instructions further includes computer-executable code when executed by the processor to cause the processor to carry out steps of establishing a connection to said subgroup, defining a connection group, and concurrently displaying only activity of users inside said connection group.

11. The system as recited in claim 6 wherein said sequences of instructions further includes computer-executable code when executed by the processor to cause the processor to carry out the step of rendering search result information, network activity and profile information in separate regions.

12. A non-transitory computer readable storage medium carrying sequences of instructions for distributing information over a network having a database in data communication with said network, with the database storing a plurality of computer readable user profiles and where the sequence of instructions, when executed a processor, causes said processor to carry out the steps of:
creating in said database, in response to input signals from an input device specifying a first topic related to a goal, a first collaborative space in the network dedicated to the first topic to facilitate centralizing communications related to the first topic in one area of the network and where off-topic communications are not present in the first collaborative space;
associating, in response to input signals from an input device, an existing second collaborative space with the goal, with the existing second collaborative space dedicated to a second topic related to the goal and where off-topic communications are not present in the existing second collaborative space;
searching said first collaborative space and said existing second collaborative space, in response to input signal from an input device, for a query term related to the goal;
generating search result information, in response to said query term, retrieved from said database for display in a search result user interface including multiple rows, with each row including personal information relating to experience and expertise of a user on the network, an icon showing a position of the user in an organization and a control for selecting the user as a contact;
collecting, in response to input signals from an input device, network activity of users other than a designated user of the network based on filtering criteria, with the filtering criteria including one or more of selecting a group of users having a selected position in the organization, selecting a collaborative space and selecting users that are contacts; and
generating, in response to input from a user input device, profile information relating to selected contacts of a designated user.

13. The non-transitory computer readable storage medium as recited in claim 12 wherein said sequences of instructions further includes computer-executable code when executed by the processor to cause the processor to carry out a step of associating said query term with a collaborative space in said network.

14. The non-transitory computer readable storage medium as recited in claim 12 wherein said sequences of instructions further includes computer-executable code when executed by the processor to cause the processor to carry out the step of displaying said activity concurrently with the corresponding members of said subgroup performing said activity.

15. The non-transitory computer readable storage medium as recited in claim 12 wherein said sequences of instructions further includes computer-executable code when executed by the processor to cause the processor to carrying out the step of rendering a representation of activity concurrently with the corresponding users of said subgroup performing said activity, defining an activity stream region of said user interface, with said subgroup including computer readable profiles and blocking information related to activity of a subset of said subgroup from being rendered in said user interface in accordance with a filtering criteria.

16. The non-transitory computer readable storage medium as recited in claim 12 wherein said sequences of instructions further includes computer-executable code when executed by the processor to cause the processor to carry out a steps of establishing a connection to said subgroup, defining a connection group, and concurrently displaying only activity of users inside said connection group.

\* \* \* \* \*

UNITED STATES PATENT AND TRADEMARK OFFICE
CERTIFICATE OF CORRECTION

| | | |
|---|---|---|
| PATENT NO. | : 8,924,382 B2 | Page 1 of 1 |
| APPLICATION NO. | : 13/474586 | |
| DATED | : December 30, 2014 | |
| INVENTOR(S) | : Banda et al. | |

It is certified that error appears in the above-identified patent and that said Letters Patent is hereby corrected as shown below:

In the Claims

In column 7, line 59, in Claim 7, before "cause" insert -- to --.

In column 7, line 64, in Claim 8, delete "processer" and insert -- processor --, therefor.

Signed and Sealed this
First Day of September, 2015

Michelle K. Lee
*Director of the United States Patent and Trademark Office*